F. A. MATHYS.
FLOAT VALVE.
APPLICATION FILED AUG. 24, 1914
1,117,210.
Patented Nov. 17, 1914.
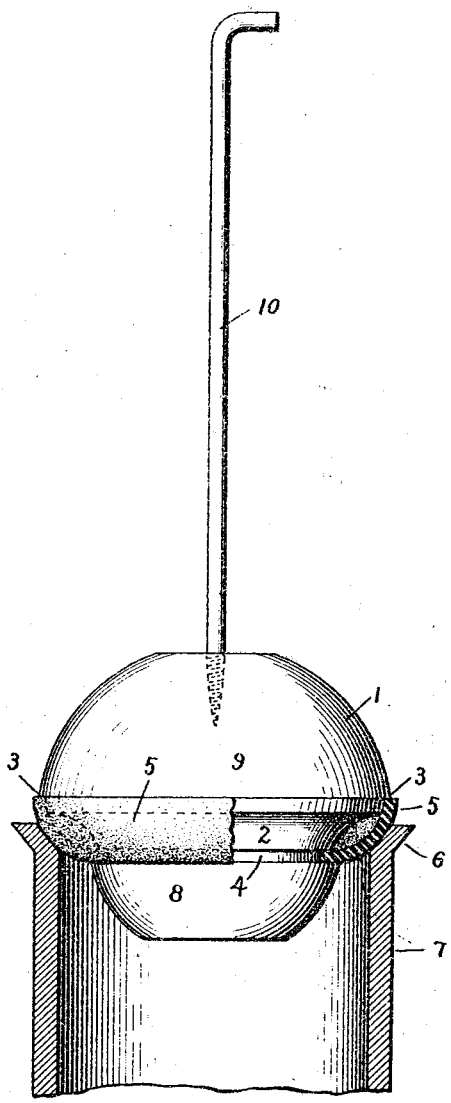
Witnesses
J. Ellis Glen
Harry E. Dunham
Inventor
Frederick A. Mathys
by W. G. Gartner
Atty.

UNITED STATES PATENT OFFICE.

FREDERICK A. MATHYS, OF SCHENECTADY, NEW YORK.

FLOAT-VALVE.

1,117,210.      Specification of Letters Patent.      Patented Nov. 17, 1914.

Continuation in part of application Serial No. 787.055, filed August 28, 1913. This application filed August 24, 1914. Serial No. 858 417.

*To all whom it may concern:*

Be it known that I, FREDERICK A. MATHYS, a citizen of the United States, residing at Schenectady, county of Schenectady, State of New York, have invented certain new and useful Improvements in Float-Valves, of which the following is a specification.

This application is a continuation in part of my application Serial No. 787,055, filed August 28, 1913.

The present invention comprises an improvement in valves which when unseated are maintained unseated by the buoyancy of a liquid in which they float until the liquid has been discharged.

A float valve as distinguished from other types of valves, is not accurately and positively seated but is dropped in place by the falling liquid at varying angles, and when seated the pressure initially holding it in place is slight, being only subsequently increased by accumulation of liquid above the valve. Therefore, it is important that a float valve should easily adapt itself to the valve seat and fit snugly even when little or no pressure is applied to it.

It is the object of my invention to provide a form of float valve not subject to deformation, the wearing part of which can be readily renewed and which will adapt itself to varying sizes and shapes of valve seats, and when seated by light pressure will not permit leakage to take place. With this object in view my valve comprises a buoyant body of novel construction having a yielding concavo-convex seating surface constituted by a renewable band of rubber or like resilient material set on said body over a free space in a manner hereinafter described.

The single figure of the drawing is a view in side elevation, partly in vertical section, of my improved float valve shown closing the outlet from a flushing tank.

By reference to the drawing it will be seen that the float valve comprises in part a spheroidal body 1 having an annular peripheral groove 2 located somewhat below a plane passing through the center. The valve ordinarily consists of wood, hollow metal or of any material being buoyant in water so as to cause the valve to float. Ordinarily I prefer wood which may be impregnated with water-proof material and varnished. The upper edge of the peripheral groove is provided with a shoulder, as shown at 3, by reducing the diameter of a narrow band of the valve body, and at the lower edge of the peripheral groove there is sunk a recess 4 in the material of the valve. A ring 5 of resilient material, such as rubber, being substantially cocavo-convex in cross section, is seated against the shoulder 3 in the recess 4, leaving a free space between substantially the entire seating portion of the ring and the inner wall of the groove 2, whereby the seating ring 5 is rendered highly yielding at its point of engagement with the valve 6 formed by the upper flared edge of an outlet pipe 7. The seating edge of the rubber seating band in the recess prevents its displacement when the valve is seated. The part 8 of the valve below the seating ring is made smaller in diameter than the upper part 9 to permit the valve to fall in place. Into the top of the valve is screwed or fastened by any means a metal stem 10 acting as a guide and suspension for the valve. By means of this construction the valve when dropped on the valve seat by the recession of the water below the level of the upper edge of the outlet pipe fits snugly against the valve seat even when slightly tilted. The convex outer surface of the seating ring and its highly yielding character produced by the free space enables a water tight fit to be obtained even with valve seats of slightly varying diameter and surface which departs from that of the seating ring.

Although I have described a preferred form of valve made in accordance with my invention, I wish it to be understood that the invention is not limited to this specific form but the valve may have any shape providing a seating ring is provided having a convex seating surface with a free space between the seating portion of the ring and the body of the valve.

What I claim as new and desire to secure by Letters Patent of the United States, is:—

1. A float valve comprising a ball lighter than an equal volume of water and having an annular peripheral groove, and an annular concavo-convex rubber band the edges of which are seated at opposite sides of said groove to present an outer convex surface and leaving a space between the surface of said ball and said band.

2. A float valve comprising a wooden ball provided with an annular peripheral groove, and a flexible concavo-convex seating ring located in said groove with a free space between substantially the entire seating portion of the ring and the inner wall of the groove.

3. A valve comprising a flotative spheroidal body having an annular peripheral groove, and a recess at one edge of said groove, and an annular concavo-convex rubber band inclosing said groove and having one edge seated in said recess.

4. A float valve comprising a flotative ball provided with an annular peripherial groove, a shoulder on one side of said groove, and a recess on the other side of said groove and a flexible concavo-convex ring having one edge seated against said shoulder and the other edge seated in said recess, leaving a free space between the seating portion of the ring and the wall of the groove.

In witness whereof, I have hereunto set my hand this 20th day of August, 1914.

FREDERICK A. MATHYS.

Witnesses:
BENJAMIN B. HULL,
W. G. GARTNER.